(12) United States Patent
Lucas

(10) Patent No.: US 8,550,518 B1
(45) Date of Patent: Oct. 8, 2013

(54) HUNTING GEAR RETRIEVER

(76) Inventor: Steven L. Lucas, West Babylon, NY (US)

( * ) Notice: Subject to any disclaimer, the term of this patent is extended or adjusted under 35 U.S.C. 154(b) by 0 days.

(21) Appl. No.: 13/398,943

(22) Filed: Feb. 17, 2012

(51) Int. Cl.
*B66C 1/34* (2006.01)

(52) U.S. Cl.
USPC ........................................ 294/82.11; 43/43.16

(58) Field of Classification Search
USPC ............ 294/66.1, 82.1, 82.13; 114/297–299, 114/301–307; 43/43.16, 44.82
See application file for complete search history.

(56) References Cited

U.S. PATENT DOCUMENTS

| | | | |
|---|---|---|---|
| 1,776,967 A * | 9/1930 | Eckart | 43/44.96 |
| 2,341,435 A | 2/1944 | Galea | |
| 3,097,373 A | 7/1963 | Wisti | |
| 3,336,067 A | 8/1967 | Cloyd | |
| 3,772,815 A | 11/1973 | Burgess | |
| 3,861,071 A * | 1/1975 | Nordhagen | 43/17.2 |
| 4,702,507 A * | 10/1987 | Medendorp | 294/66.1 |
| 4,817,326 A | 4/1989 | Benjestorf | |
| 5,555,669 A * | 9/1996 | Fitzgerald | 43/44.96 |
| 6,106,042 A | 8/2000 | McCloy, Jr. | |
| 6,267,424 B1 | 7/2001 | Gillette | |
| 6,640,486 B1 | 11/2003 | Rigney | |
| 2003/0116074 A1 | 6/2003 | Williams | |
| 2005/0193939 A1* | 9/2005 | Ross | 114/297 |
| 2008/0245287 A1* | 10/2008 | Vogan et al. | 114/293 |

* cited by examiner

*Primary Examiner* — Stephen Vu
(74) *Attorney, Agent, or Firm* — Richard L. Miller

(57) ABSTRACT

A hunting gear retriever which comprises a weighted body of substantially rigid material. A hook assembly is supported by an protrudes outwardly from a forward end of the weighted body in axial alignment therewith. A loop extends outwardly from a rearward end of the weighted body for securing the weighted body to a lanyard. When the weighted body is dropped down by a hunter in a tree onto a surface, the weighted body will topple over onto one side allowing the hook assembly to be manually dragged by the lanyard along the surface and engage with an item laying on the surface, so that the item can be pulled upwardly by the hunter into the tree.

5 Claims, 5 Drawing Sheets

HUNTING GEAR RETRIEVER

BACKGROUND OF THE INVENTION

1. Field of the Invention

The present invention relates to a retrieving device, and more particularly, a hunting gear retriever.

2. Description of the Prior Art

Numerous innovations for grappling hooks have been provided in the prior art that will be described. Even though these innovations may be suitable for the specific individual purposes to which they address, however, they differ from the present invention.

A FIRST EXAMPLE, U.S. Patent Office Document No. 2,341,435, Issued on Feb. 8, 1944, to Galea teaches a tool for recovering foreign objects in toilet bowls, comprising a chain, a grappling hook at one end thereof, and a perforated ball sliding on the chain to occupy a position adjacent the grappling hook whereby the ball and grappling hook may be washed through the bowl by normal flushing action.

A SECOND EXAMPLE, U.S. Patent Office Document No. 3,097,373, Issued on Jul. 16, 1963, to Wisti teaches for use in retrieving an object submerged in a body of water; manually usable retrieving means comprising a float having a line passage extending axially therethrough, a retrieving line having a portion passing slidingly through the passage, a grapple means embodying a shank provided at one end with radial circumferentially spaced hooks, provided at the other end with an eye to which an end of the line is connected, and an elongated weight carried by and surrounding the shank between the eye and hooks, the weight being of a cross-section that it is adapted when not in use to fit telescopingly in an end portion of the passage in the float with the terminals of the hooks abutting an end of the float, a spool on which the line is adapted to be wound, and a handle-equipped holder for the spool and also the float, the size and radial spread and circumferential spacing of the hooks being such that the terminal ends embrace the cooperating end portion of the float in a safeguarded manner.

A THIRD EXAMPLE, U.S. Patent Office Document No. 3,336,067, Issued on Aug. 15, 1967, to Cloyd teaches a fishing accessory comprising a length of wire shaped to define a U-shaped bight portion and an annular loop portion, one end of the wire being shaped to define an eye and the other end thereof being shaped to define a hook engageable with the eye for closing the loop portion, a weight connected to and enclosing an intermediate portion of the bight portion with a closed end of the bight portion extending from the body of the weight for form an eye for receiving a safety line, a plurality of grappling hook members having a shank terminated in a coil having at least two turns through which the first mentioned hook passes for supporting the grappling hook members on the looped portion, and a plurality of tubular spacers on the loop portion for separating the hook members.

A FOURTH EXAMPLE, U.S. Patent Office Document No. 3,772,815, Issued on Nov. 20, 1973, to Burgess teaches a fish lure retriever which includes a weighted body having a large central aperture opened on one side by a narrow slot. The body is connected to a heavy cord and permitted to slide down a fish line having a snagged lure on its lower end. Slotted weights are detachably connected to the lower end of the retriever, the slots opening into the aperture to engage the fish line. The body has a plurality of grapple hooks loosely secured to its lower end and adapted to grapple with the object on which the lure is snagged so that the object can be lifted to the surface along with the lure snagged thereon, or if the object is too heavy to pull the lure therefrom.

A FIFTH EXAMPLE, U.S. Patent Office Document No. 4,817,326, Issued on Apr. 4, 1989, to Benjestorf teaches a hollow tube capable of passing one or more turns of fishing line through its bore is encased by a spheroidal bubble member, creating an airtight chamber between the tube and the bubble member. Within this airtight chamber a predetermined amount of high density lead metal shot allows predetermination of the aggregate weight and density of the casting bubble. The weight is important during casting and the density is important for controlled flotation during lure retrieval. The shifting high density material changes the center of gravity of the weighted casting bubble between those times when the bubble is cast and during its retrieval. During retrieval the weighted casting bubble resists angular rotation.

A SIXTH EXAMPLE, U.S. Patent Office Document No. 6,106,042, Issued on Aug. 22, 2000, to McCloy Jr. teaches a manually-operable device for use by tree stand hunters for retrieving items that have been left on the ground or that have fallen from the hunter or tree stand onto the ground, includes an elongated shank, a rope having one end attached to the shank and an opposite end for grasping by the hunter situated in the tree stand, a plurality of flexible arms attached to the shank which are movable from an open position to a gripping position and are radially disposed circumjacent the longitudinal axis of the shank, a trigger plate slidably mounted on the arms for selectively spreading the arms and selectively closing the arms so that the item can be retrieved and released, and a weighted disc mounted on the shank for linear, reciprocable movement thereon so that the movement of the disc on the shank causes the disc to contact the trigger plate thereby forcing the trigger plate to slide on the arms, thus drawing the arms toward the shank axis so that the arms engage and retrieve the item.

A SEVENTH EXAMPLE, U.S. Patent Office Document No. 6,267,424, Issued on Jul. 31, 2001, to Gillette teaches a light weight compact grappling hook which finds use in at least urban terrain comprising a small head member provided with a plurality of arms or blades which are serrated and/or provided with cutting surfaces/edges. The shaft which is connected to the head can be rigid or flexible. The flexible feature facilitates achieving a hold on surfaces which might otherwise be difficult. The arms or blades are each pivotally supported on pairs of pins and can be spread from folded storage positions and locked in position prior to deployment, or can be spring biased so that spreading and operative deployment is achieved en route to the target.

AN EIGHTH EXAMPLE, U.S. Patent Office Publication No. 2003/0116074, Published on Jun. 26, 2003, to Williams teaches a grappling hook for use in mooring boats. It has an elongated shank defining an axis and having first and second ends thereon. The shank has a mooring line fastened to the first end and a hook-shaped grasping end at the second end extending outward from the axis. The hook has a balance point on the shank where the weight of the first end equals the weight of the second end. To moor the boat, the hook is thrown therefrom over an obstruction by the mooring line and drawn toward the boat, and when the balance point on the shank reaches the obstruction, the force of gravity lifts the hook end from the obstruction and rotates it downward about the shank to engage the obstruction, making fast the boat.

A NINTH EXAMPLE, U.S. Patent Office Document No. 6,640,486, Issued on Nov. 4, 2003, to Rigney teaches a hook having a shank with an eye at one end and a bent portion culminating in a point at the other end and having a specific gravity greater than the specific gravity of water is combined with a buoyant body mounted on the hook and means connected to the hook which, in cooperation with the buoyant body, causes the point of the hook to float above the eye of the hook in the water. In one embodiment, the cooperating means is a weight mounted on the hook or made integrally as part of the hook and located between the eye of the hook and the buoyant body so as to cause the eye to orient below the buoyant body. In another embodiment, the cooperating means is a plug to which the eye is pivotally connected to provide a point about which the buoyant body will cause the hook to rotate and thus orient the point of the hook above the eye. In an alternate to the latter embodiment, the pivotal connection can be arranged so that the point of the hook is directed toward the rear of the plug.

It is apparent now that numerous innovations for grappling hooks have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a hunting gear retriever that avoids the disadvantages of the prior art.

ANOTHER OBJECT of the present invention is to provide a hunting gear retriever that is simple and inexpensive to manufacture.

STILL ANOTHER OBJECT of the present invention is to provide a hunting gear retriever that is simple to use.

BRIEFLY STATED, STILL YET ANOTHER OBJECT of the present invention is to provide a hunting gear retriever which comprises a weighted body of substantially rigid material. A hook assembly is supported by an protrudes outwardly from a forward end of the weighted body in axial alignment therewith. A loop extends outwardly from a rearward end of the weighted body for securing the weighted body to a lanyard. When the weighted body is dropped down by a hunter in a tree onto a surface, the weighted body will topple over onto one side allowing the hook assembly to be manually dragged by the lanyard along the surface and engage with an item laying on the surface, so that the item can be pulled upwardly by the hunter into the tree.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
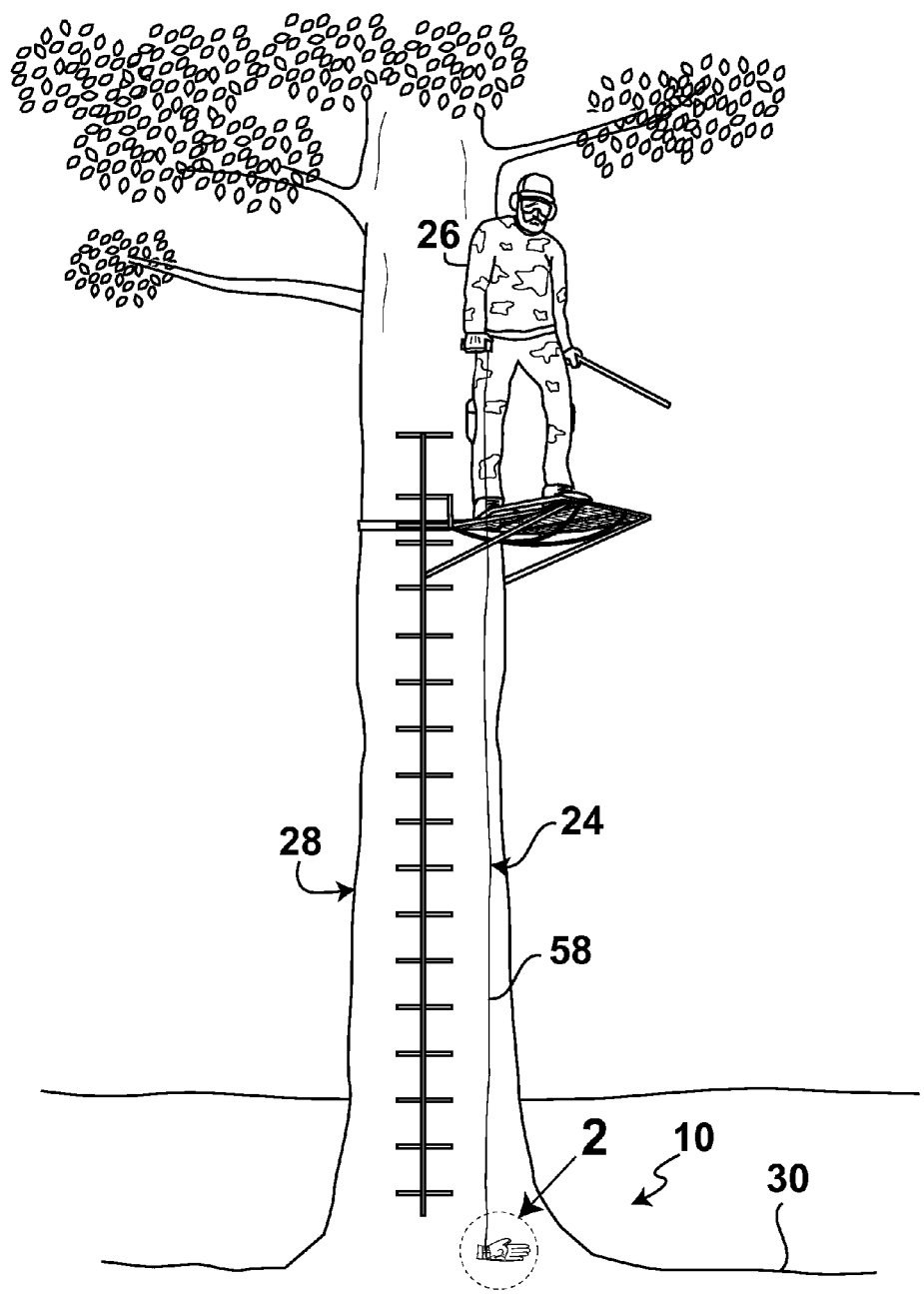
FIG. 1 is a diagrammatic perspective view of an embodiment of the present invention in use retrieving a glove.

| A MARSHALING OF REFERENCE NUMERALS UTILIZED IN THE DRAWING | |
|---|---|
| 10 | hunting gear retriever |
| 12 | weighted body of retriever 10 |
| 14 | rigid material of weighted body 12 |
| 16 | hook assembly of retriever 10 |
| 18 | forward end of weighted body 12 |
| 20 | loop of retriever 10 |
| 22 | rearward end of weighted body 12 |
| 24 | lanyard |
| 26 | hunter |
| 28 | tree |
| 30 | surface |
| 32 | item |
| 34 | lead metal of rigid material 14 |
| 36 | grappling hook for hook assembly 16 |
| 38 | first non-barbed protruding fluke of grappling hook 36 |
| 40 | second non-barbed protruding fluke of grappling hook 36 |
| 42 | third non-barbed protruding fluke of grappling hook 36 |
| 44 | first segment of grappling hook 36 |
| 46 | shank portion of first segment 44 |
| 48 | second segment of grappling hook 36 |
| 50 | first shank portion of second segment 48 |
| 52 | second shank portion of second segment 48 |
| 54 | common bent end of first and second shank portions 50, 52 |
| 56 | free end of loop 20 |
| 58 | nylon rope for lanyard 24 |

DETAILED DESCRIPTION OF THE PREFERRED EMBODIMENT

Figure 2:
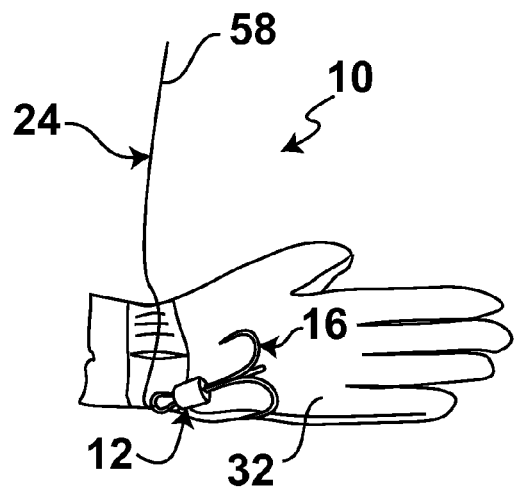
FIG. 2 is an enlarged diagrammatic perspective view of the area enclosed in the dotted circle indicated by numeral 2 in FIG. 1.
Figure 3:
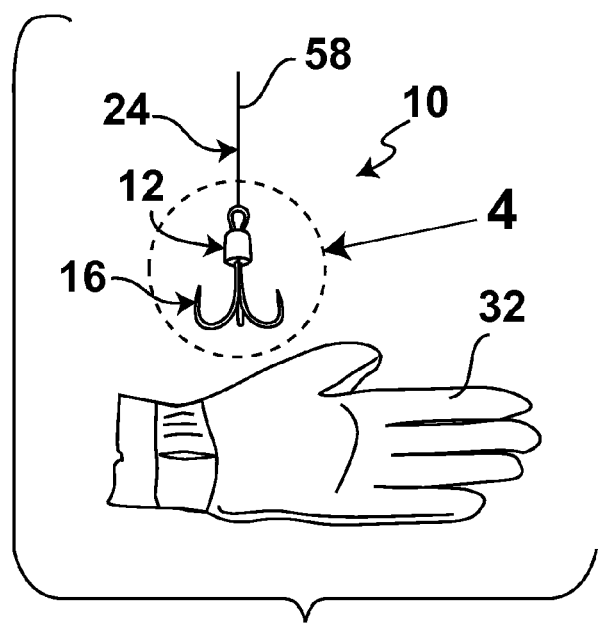
FIG. 3 is a diagrammatic perspective view, similar to FIG. 2, showing the present invention getting ready for retrieving the glove.
Figure 4:
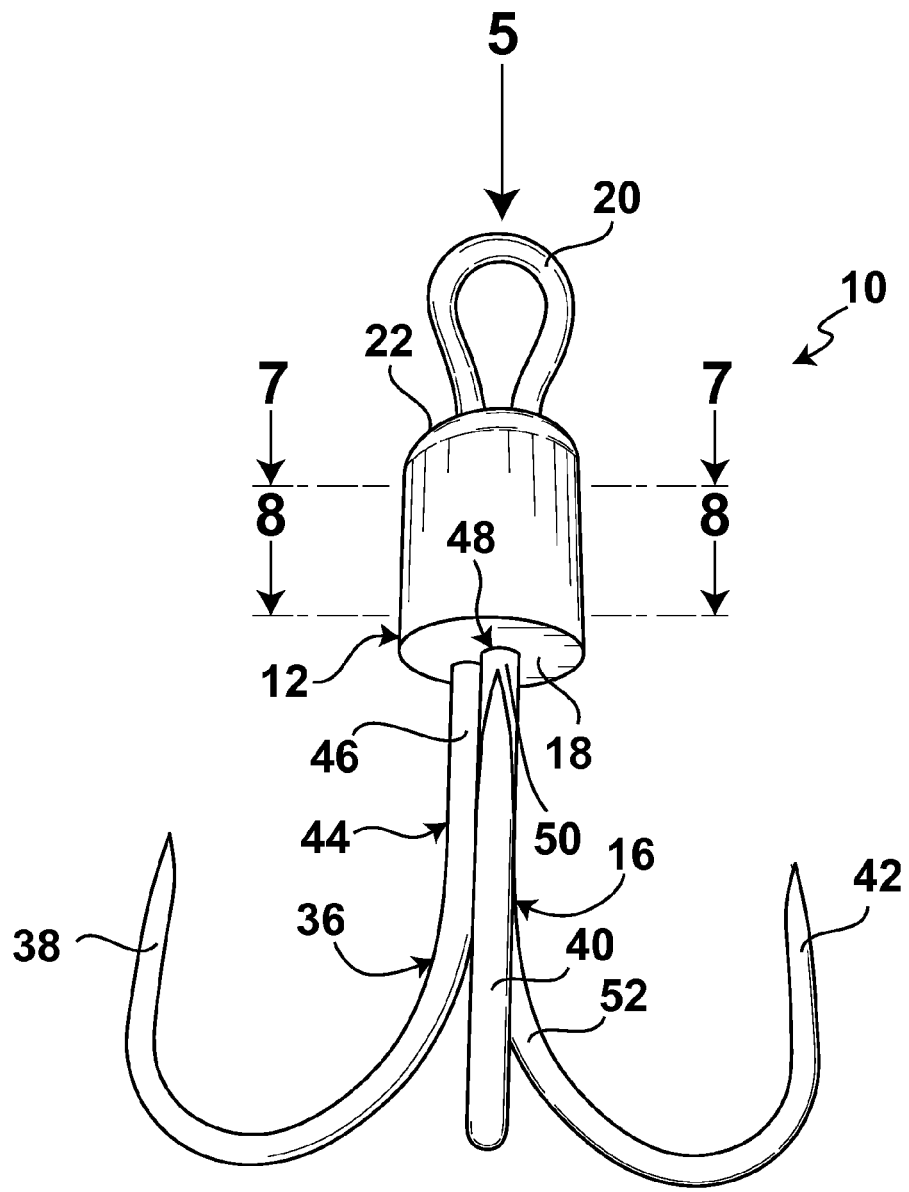
FIG. 4 is an enlarged diagrammatic perspective view of the area enclosed in the dotted circle indicated by numeral 4 in FIG. 3.
Figure 5:
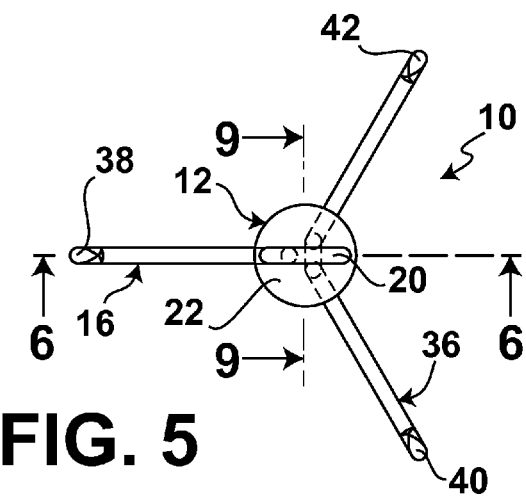
FIG. 5 is a diagrammatic top view taken in the direction of arrow 5 in FIG. 4.
Figure 6:
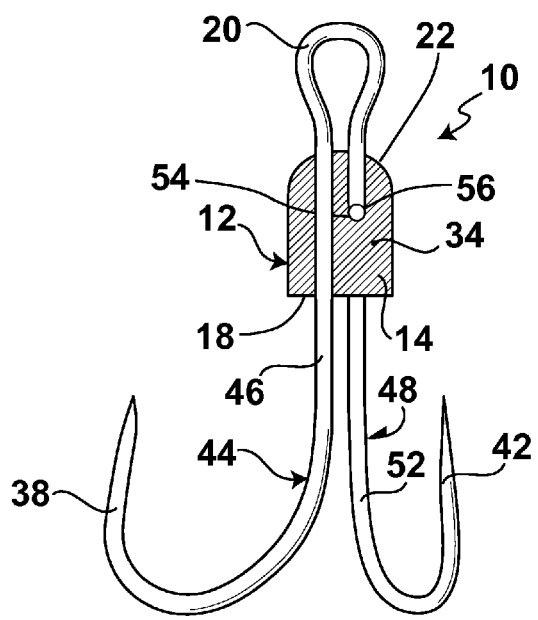
FIG. 6 is a diagrammatic partial cross sectional view taken on line 6-6 in FIG. 5.
Figure 9:
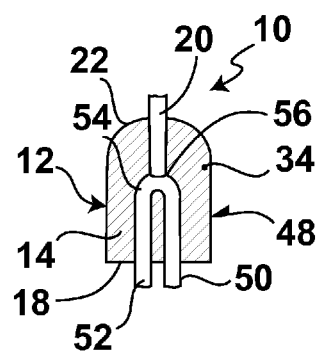
FIG. 9 is a diagrammatic partial cross sectional view, with parts broken away, taken on line 9-9 in FIG. 5.
Figure 7:
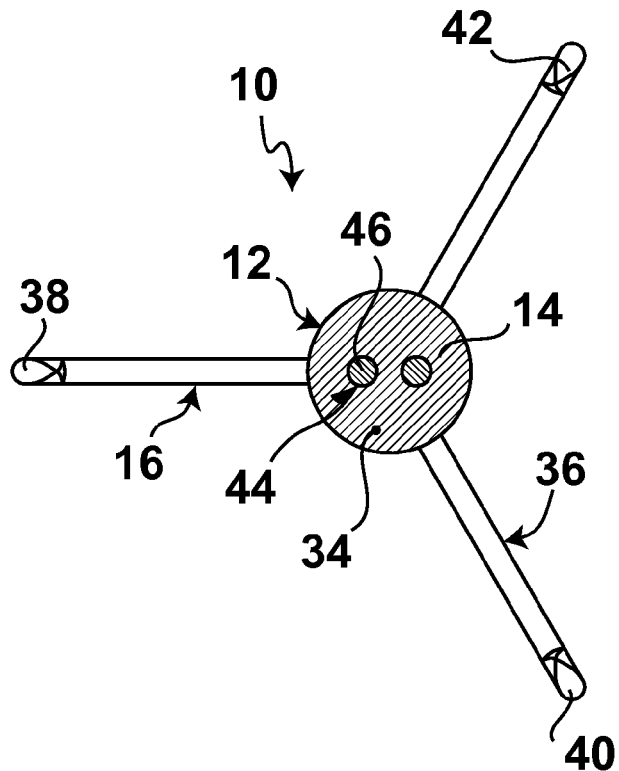
FIG. 7 is a diagrammatic cross sectional view taken on line 7-7 in FIG. 4.
Figure 8:
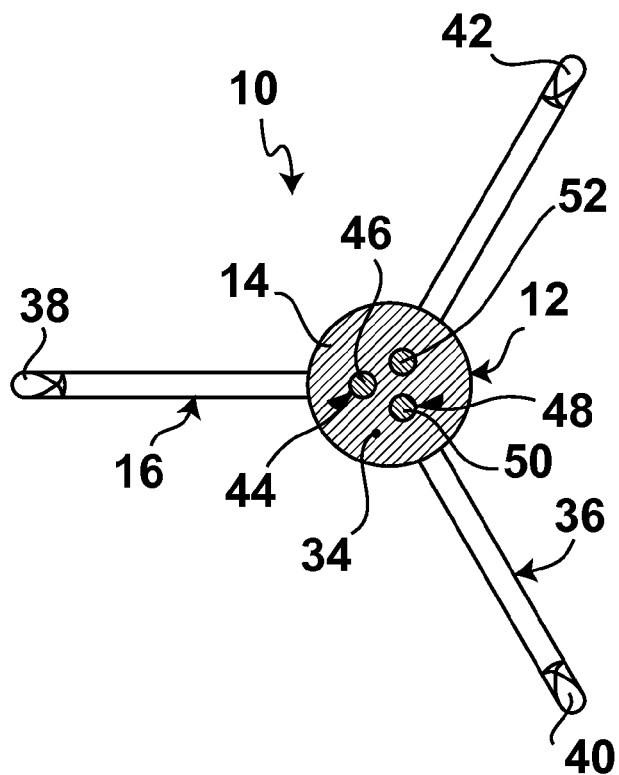
FIG. 8 is a diagrammatic cross sectional view taken on line 8-8 in FIG. 4.

Referring now to the figures, in which like numerals indicate like parts, and particularly to FIGS. 1, through 9, which are a diagrammatic perspective view of an embodiment of the present invention in use retrieving a glove; an enlarged diagrammatic perspective view of the area enclosed in the dotted circle indicated by numeral 2 in FIG. 1; a diagrammatic perspective view, similar to FIG. 2, showing the present invention getting ready for retrieving the glove; an enlarged diagrammatic perspective view of the area enclosed in the dotted circle indicated by numeral 4 in FIG. 3; a diagrammatic top view taken in the direction of arrow 5 in FIG. 4; a diagrammatic cross sectional view taken on line 6-6 in FIG. 5; a diagrammatic cross sectional view taken on line 7-7 in FIG. 4; a diagrammatic cross sectional view taken on line 8-8 in FIG. 4; and a diagrammatic cross sectional view, with parts broken away, taken on line 9-9 in FIG. 5, and as such, will be discussed with reference thereto.

The present invention is a hunting gear retriever 10 which comprises a weighted body 12 of substantially rigid material 14. A hook assembly 16 is supported by and protrudes outwardly from a forward end 18 of the weighted body 12 in axial alignment therewith. A loop 20 extends outwardly from a rearward end 22 of the weighted body 12 for securing the weighted body 12 to a lanyard 24. When the weighted body 12 is dropped down by a hunter 26 in a tree 28 onto a surface 30, the weighted body 12 will topple over onto one side allowing the hook assembly 16 to be manually dragged by the lanyard 24 along the surface 30 and engage with an item 32 laying on the surface 30, so that the item 32 can be pulled upwardly by the hunter 26 into the tree 28.

The rigid material 14 of the weighted body 12 is formed of a solid cast lead metal 34 having a cylindrical shape and a constant cross section. The lead metal 34 weighs approximately one and a half ounces.

The hook assembly 16 comprises a grappling hook 36 having at least three non-barbed protruding flukes 38,40,42 arranged in a regular radial fashion about the forward end 18 of the weighted body 12. The grappling hook 36 comprises a first segment 44 having a shank portion 46 extending through the weighted body 12. The shank portion 46 is integral with the first non-barbed protruding fluke 38 and the loop 20. A second segment 48 having two shank portions 50,52 with a common bent end 54 extends into the weighted body 12. The two shank portions 50,52 are integral with the second and third non-barbed protruding flukes 40,42. The common bent end 54 is affixed to a free end 56 of the loop 20 within the weighted body 12.

The lanyard 24 comprises a nylon rope 58 of approximately twenty five feet in length. The retriever 10 is of a small size and light enough to be kept in a pocket and a pack of the hunter 26.

It will be understood that each of the elements described above, or two or more together, may also find a useful application in other types of constructions differing from the types described above.

While the invention has been illustrated and described as embodiments of a hunting gear retriever, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A hunting gear retriever which comprises:
a) a weighted body of substantially rigid material;
b) a hook assembly protruding outwardly from a forward end of said weighted body in axial alignment therewith; and
c) a loop extending outwardly from a rearward end of said weighted body for securing said weighted body to a lanyard, whereby when said weighted body is dropped down by a hunter in a tree onto a surface, said weighted body will topple over onto one side allowing said hook assembly to be manually dragged by the lanyard along the surface and engage with an item laying on the surface, so that the item can be pulled upwardly by the hunter into the tree, wherein said hook assembly comprises a grappling hook having at least three non-barbed protruding flukes arranged in a regular radial fashion about the forward end of said weighted body, wherein said grappling hook comprises:
d) a first segment having a shank portion extending through said weighted body, wherein said shank portion is integral with said first non-barbed protruding fluke and said loop; and
e) a second segment having two shank portions with a common bent end extending into said weighted body, wherein said two shank portions are integral with said second and third non-barbed protruding flukes and said common bent end affixed to a free end of said loop within said weighted body.

2. The retriever as recited in claim 1, wherein said rigid material of said weighted body is formed of a solid cast lead metal having a cylindrical shape and a constant cross section.

3. The retriever as recited in claim 2, wherein said lead metal weighs approximately one and a half ounces.

4. The retriever as recited in claim 1, wherein said lanyard comprises a nylon rope of approximately twenty five feet in length.

5. The retriever as recited in claim 1, comprised of a small size and light enough to be kept in a pocket and a pack of the hunter.

\* \* \* \* \*